United States Patent [19]

Killion

[11] 4,084,642
[45] Apr. 18, 1978

[54] TURF PERFORATING MACHINE

[76] Inventor: Marvin L. Killion, 510 Pontiac Dr., Gretna, Nebr. 68028

[21] Appl. No.: 705,722

[22] Filed: Jul. 13, 1976

[51] Int. Cl.² ............................................. A01B 45/02
[52] U.S. Cl. ...................................................... 172/21
[58] Field of Search .................... 172/21, 22; 111/89, 111/90, 6

[56] References Cited

U.S. PATENT DOCUMENTS

| | | | |
|---|---|---|---|
| 2,056,337 | 10/1936 | Archibald | 172/21 |
| 2,236,562 | 4/1941 | Brandes | 172/22 |
| 2,255,040 | 9/1941 | Helbig | 172/21 |
| 2,638,831 | 5/1953 | Ferguson et al. | 172/22 |
| 2,800,066 | 7/1957 | Cohrs et al. | 172/22 |

FOREIGN PATENT DOCUMENTS 1,250,983   12/1960   France ..................... 172/22

*Primary Examiner*—Paul E. Shapiro
*Attorney, Agent, or Firm*—Henderson, Strom, Sturm, Cepican & Fix

[57] ABSTRACT

A turf perforating machine for aerating lawns by removing plugs therefrom comprising a wheeled frame having a plurality of reciprocating tools, each connected by a linkage to an eccentric mounted on a journal and each linkage slidably mounted in a pivotable guide secured to the journal which prevents binding of the linkage as the frame is moved across the lawn and the tool is disposed in the ground, and including further a retractor unit for pivoting the guide, linkage and tools to a nonperforating position.

8 Claims, 6 Drawing Figures

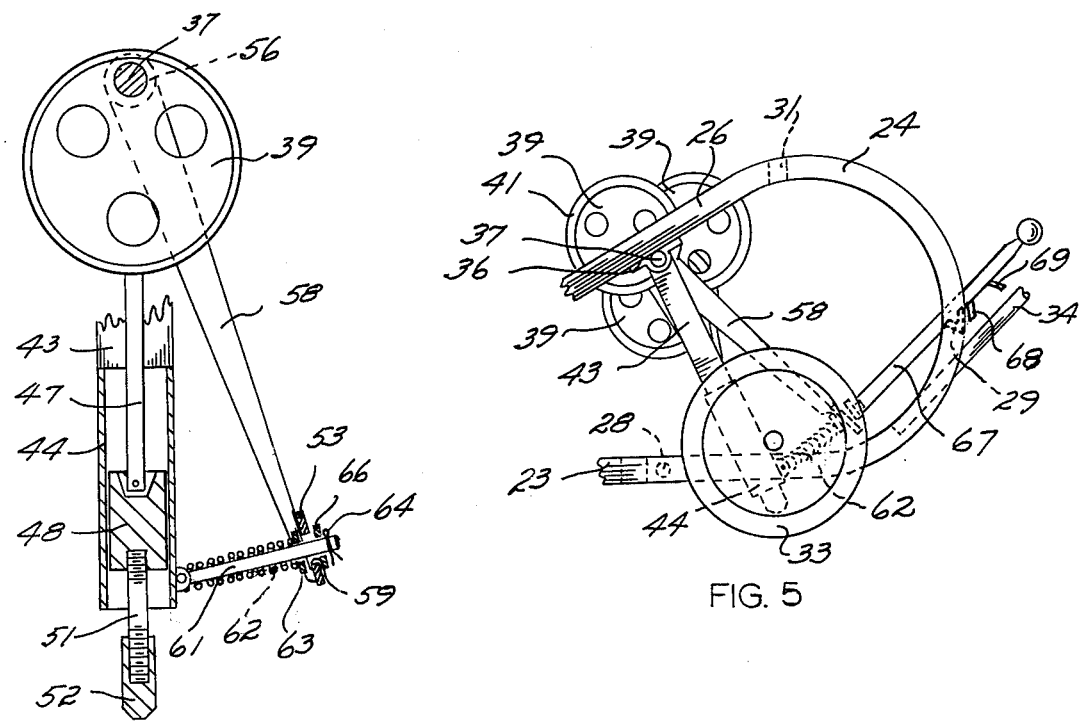
FIG. 4
FIG. 5
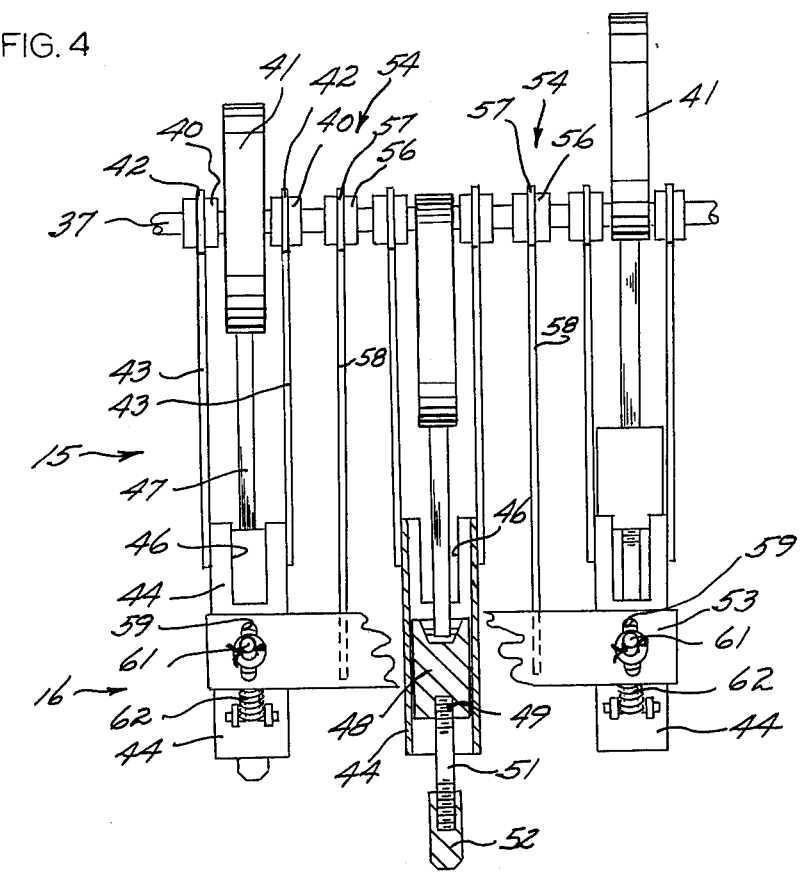
FIG. 6

TURF PERFORATING MACHINE

BACKGROUND OF THE INVENTION

This invention relates to a turf perforating machine for perforating a lawn or the like by removing a plurality of plugs therefrom. The aeration of turf is essential to allow ventilation to accelerate decomposition of thatch and humus, and to provide solid access for nutrient supply and for reseeding.

Several mechanized devices exist wherein a vertical punching motion is employed while the device is pushed or pulled across the surface of the lawn. This traversing motion causes the punching or coring tool to perforate the turf, but it also compacts the forward edge of the hole. Various structures are available to alleviate the hole compaction problem; however, they all relate to the movement of the reciprocating tool and linkage and thus are extremely complicated.

In addition, many turf perforating machines do not provide a retraction device or the like which is operable to move the perforating device to a nonperforating position; thus enabling the machine to be moved across areas which would damage the tools or where perforating is not desired.

A search of the market place discloses that there is no turf perforator machine that plugs the turf, that is light in weight, that is economical to manufacture, and that is extremely effective.

SUMMARY OF THE INVENTION

The turf perforating machine of this invention includes a frame supported above the surface of the ground by a plurality of wheels, a journal rotatably mounted on the frame, an eccentric secured to the journal, reciprocating unit secured to the journal, a guide for the reciprocating unit pivotally connected to the journal and having the reciprocating unit slidably disposed therein, a spring retractor device connected between the guide and the frame to bias the guide in a first position, a tool secured to the reciprocating unit for perforating the turf and a power unit mounted on the frame and connected to the journal for rotating the latter. The pivotal action of the guide permits an operator to propel the device at any speed and yet avoid any binding on the reciprocating unit because a tool is in the ground and the retractor device provided to pivot the guides to nonperforating position.

It is, therefore, an object of this invention to provide an improved turf perforating machine.

Yet another object is the provision of a turf perforating machine having a reciprocating member connected to an eccentric mounted on a journal and slidably disposed in a guide which is pivotably connected to the journal for preventing any damage to the reciprocating unit when a portion thereof is embedded in the ground and the machine is being propelled in a forward direction.

A further object of this invention is the provision of a turf perforating machine utilizing a retractor device wherein the reciprocating units which are connected thereto ae pivotal to a neutral drive or nonperforating position to enable the machine to be propelled across areas where no perforations are desired or are possible.

Yet a further object of this invention is the provision of a turf perforating machine having a reciprocating unit slidably mounted in a guide and having a retractor unit connected to the guide for moving the guide and reciprocating unit to a nonperforating position wherein the guide, reciprocating unit and the retractor unit all pivot in a common arc, thus alleviating any binding forces on the machine.

Still another object of this invention is to provide a turf perforating machine that is simple of construction, economical to manufacture, light in weight, and extremely effective in operation.

These objects and other features and advantages become more apparent upon reference to the following description when taken in conjunction with the appended drawings.

BRIEF DESCRIPTION OF THE DRAWINGS

In the drawings, although various modifications and alternate constructions can be made thereto without departing from the true invention, a preferred embodiment of the invention is illustrated, wherein:

FIG. 4 is a partial sectional view taken along the lines 4—4 in FIG. 3;

FIG. 5 is a partial side elevational view of the guides in nonperforating position; and FIG. 6 is a partial sectional view taken at 90° to FIG. 4.

DESCRIPTION OF THE PREFERRED EMBODIMENT

Figure 1:
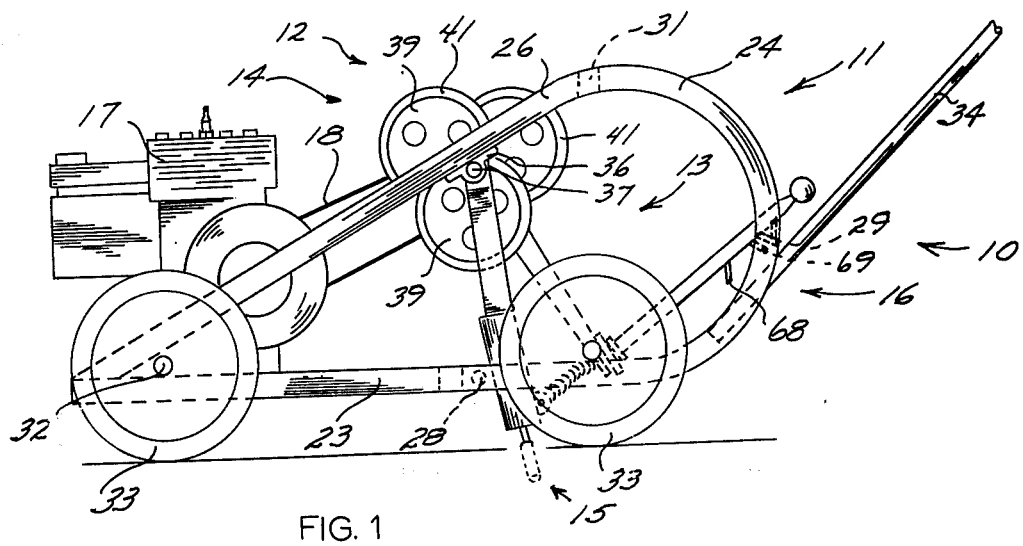
FIG. 1 is a side elevational view of the turf perforating machine of this invention.
Figure 2:
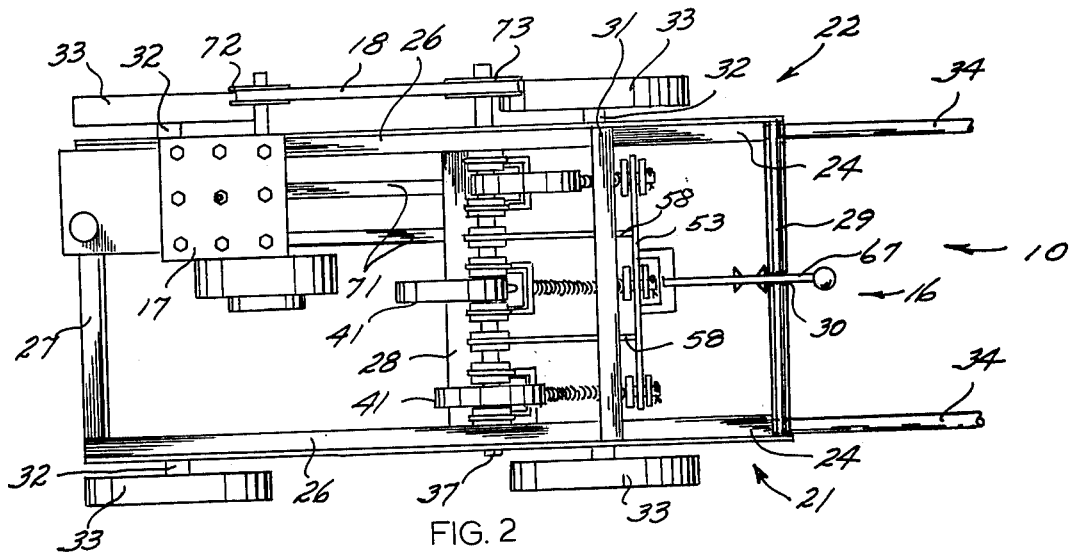
FIG. 2 is a top plan view thereof.

Turning now to FIGS. 1 and 2 of the drawings, there is depicted generally by the numeral 10 the turf perforating machine of this invention. The machine 10 includes a wheeled frame 11, a journal device 12 rotatably mounted on the frame 11, a plurality of guide devices 13 pivotally connected to the journal 12, a plurality of eccentric units 14 secured to the journal 12, a reciprocating unit 15 connected to each eccentric unit slidably mounted in a guide device, a retractor device 16 pivotally mounted on the journal device 12 and operably connected to the guide devices, and a power unit 17 mounted on the frame 11 and operably connected to the journal device 12 by a belt 18 or the like.

The frame 11 (FIGS. 1 and 2) includes a pair of parallel side units 21 and 22 wherein each member is formed from an elongated angle iron which is bent into a triangular shape with its ends welded together and having an arcuate end wall. One portion of each side wall unit is horizontally disposed and thus represents a bottom wall 23, an arcuate end member 24 projects rearwardly and represents an end wall, and an angled side member 26 represents a top wall. Interconnecting the apexes of the units 21 and 22 is a forward cross member 27. Spaced rearwardly of and parallel to the cross member 27 is a limit member 28 which is secured at its ends to the one side 23 of each member. A retractor member 29, formed from an elongated angle iron, is mounted between the arcuate members 24 and a slot 29 and 30 is formed in each leg thereof for purposes hereinafter defined. A reinforcing member 31, parallel to the cross members 27, is secured at its ends to rear ends of the angled sides 26 proximate the arcuate ends 24. Stub axles 32 are secured to and project laterally of the side members 24 with two of the stub axles disposed proximate the forward end and with the other two stub axles disposed proximate the rear end of the side members. Rotatably mounted on each stub axle is a wheel 33. Secured to the arcuate members 24 and projecting forwardly and rearwardly therefrom is a handle structure 34, only partially shown, for pushing and guiding the wheeled frame 11.

Secured between the angled members 26 (FIGS. 4 and 5) and depending therefrom is the journal device 12. The journal device includes a pair of aligned journal plates 36, with each secured to and depending from one of the angled members. Rotatably mounted in the journal plates and extending transversely of the side units is a shaft 37. Secured to the shaft and equally spaced therealong are three eccentric units 14. Each eccentric unit 14 includes a disk 39 eccentrically secured to the shaft and a circular strap 41 slidably disposed around the periphery of the disk 39. It will best be observed in FIGS. 1 and 5 that the disks are offset relatives to each other at substantially 120° for a purpose hereinafter described.

Each guide device 13 (FIGS. 4 and 6) includes a pair of wooden bearings 40, one mounted on each side of a disk 39 on the shaft 37. Secured over each bearing 40 is a connecting strap 42 and secured to each connecting strap and depending therefrom is a bar 43. An open ended guide 44 is secured between the ends of adjacent bars. The forward and rear wall of the guide 44 has a notch 46 formed therein for a purpose hereinafter described.

Each reciprocating unit 15 includes a depending rod 47 having its top one end secured to the strap 41 and having its bottom end disposed in the guide 44. A block 48, pivotally secured to the bottom end of the rod 47, is operable to reciprocate within the guide and has a periphery only slightly smaller than the guide. A hole 49 is drilled and tapped in the bottom wall of the block and a stub shaft 51 is threadably mounted therein. The stub shaft is threaded on both ends and a perforating tool 52 is removably secured thereon.

Operably connected between the frame 11 and the guides 44 is the retractor device 16 (FIGS. 2 and 6). The device 16 includes a transversely disposed bar 53 pivotally suspended from the shaft 37 by a pair of spaced hanger devices 54. Each hanger device 54 includes a bearing 56 mounted on the shaft 37. Secured over each bearing 56 is a connector strap 57 and secured to each connecting strap and depending therefrom is a hanger 58. The bar 53 is secured to the free ends of the hangers 58. Three spaced openings 59 are formed in the bar 53 and an arm 61 (FIG. 4) is disposed in each, with one end of the arm 61 hingedly connected to the guide 44 and the other end of the arm projecting through the slot in the bar. A compression spring 62 is mounted on each arm with one end coacting with the guide and the other end coacting with a washer 63 disposed on the arm and over the slot. A pin 64 is locked on the other end of the arm and coacts with a second washer 66 to prevent the bar from becoming disengaged from the arm. Hingedly connected to and extending rearwardly of the bar 53 is a lever 67.

A pair of spaced, opposed, angularly inclined, depending flanges 68 and 69 are secured to the lever 67 intermediate its ends. The flanges diverge relative to each other at approximately a 90° angle with each flange disposed parallel to one of the legs of the retractor member 29. The lever 67 at approximately its mid point is disposed in the slots 30. The retractor member 29 is mounted between the arcuate members 24 with the free ends of the legs projecting upwardly wherein the plane in which the free ends lie is disposed parallel to the longitudinal axis of the lever 67. The lever 67 is movable from an operating position (FIG. 1), wherein the outer flange 69 is seated against the forward leg of the member 29 and held there by the bias of the springs 62 against the bar 53, to a transport position (FIG. 5) by pivoting the lever and pulling the bar 53 rearwardly wherein the inner flange 68 seats against the rearward leg of the member 29 with the weight of the lever, the bar, and the guides maintaining the flange against the member.

Interconnecting the cross member 27 (FIG. 2) and the limit member 28 are parallel longitudinal braces 71. Mounted on the braces is a conventional gasoline engine 17 which is belt 18 connected to the shaft 37 via a pair of pulleys 72 and 73. The former pulley is secured to the drive shaft of the engine and the latter is secured to the shaft outwardly of the side unit 21.

Figure 3:
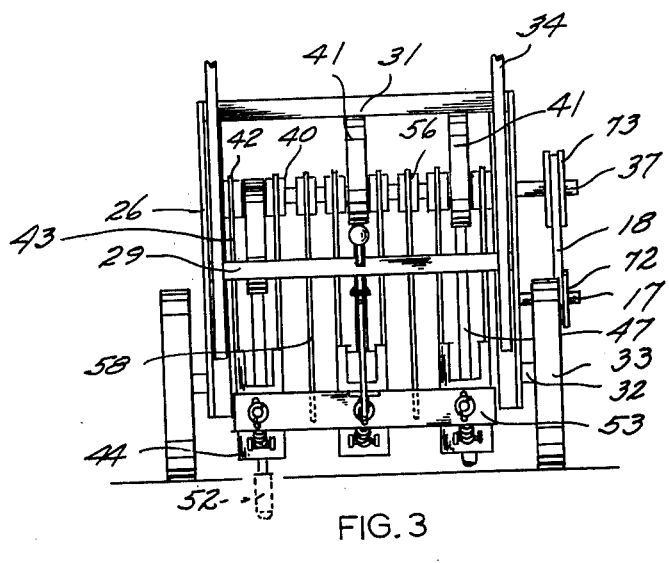
FIG. 3 is a partial rear elevational view thereof.

In operation the retractor lever 67 is moved to the transport position, the engine 17 is started and the action of the eccentris 14 causes the reciprocating units 15 to reciprocate in the guides 44. The lever 67 is moved to the operating position wherein the tools 52 alternately penetrate into the ground (FIG. 3) and the wheeled frame is moved in a forward direction. As the frame 11 moves forward, the tool 52 punches or plugs the ground and when the tool 52 is in the ground, it will not restrict the forward movement of the frame 11 as each guide 44 will pivot against the bias of its respective spring 62. In the event it is desired to cross an area such as concrete, the retractor lever 67 is moved to the transport position thus moving the bottom end of the guide rearwardly to place the tools in a nonperforating position.

I claim:

1. A turf perforating machine comprising:
   a wheeled frame;
   a laterally disposed shaft rotatably mounted on said frame;
   power means mounted on said frame and operably connected to said shaft;
   a guide device pivotally connected to said shaft and depending therefrom;
   an eccentric unit secured to said shaft;
   a reciprocating unit slidably disposed in said guide device and having one end connected to said eccentric unit and having the other end depending from said guide unit; and
   a tool unit secured to and depending from said reciprocating unit.

2. A turf perforating machine as defined in claim 1 and said guide device including a pair of bearings disposed on said shaft with one of said bearings mounted on each side of said eccentric unit, a pair of elongated spaced bars with each secured on one end to said bearing and having the other end generally depending therefrom and an open ended guide secured between the other ends of said bars with said open ends disposed one over the other; said reciprocating unit disposed between said bars and said guide.

3. A turf perforating machine as defined in claim 1 and including a manually operated retractor unit interconnected between said frame and said guide device for pivoting said guide device to a nonoperating position.

4. A turf perforating machine as defined in claim 3 and including a spring interconnected between said guide device and said retractor unit for biasing said guide guide device to an operating position.

5. A turf perforating machine as defined in claim 4 and said retractor unit including an elongated hanger pivotally secured on one end to said shaft, a transversely, horizontally disposed bar secured to the other end of said hanger, an arm having one end pivotally secured to said guide device and having another end movably secured to said bar, said spring disposed between said guide device and said bar on said arm, a lever secured on one end to said bar and operably connected on the other end to said frame wherein said lever is movable from an operating position wherein said guide device is in said operating position to a transport position wherein said guide device is in said nonoperating position.

6. A turf perforating machine as defined in claim 5 and said guide device including a pair of bearings disposed on said shaft with one of said bearings mounted on each side of said eccentric unit, a pair of elongated spaced bars with each secured on one end to a bearing and having the other end generally depending therefrom, and an open ended guide secured between the other ends of said bars with said open ends disposed one over the other said reciprocating unit disposed between said bars and in said guide.

7. A turf perforating machine as defined in claim 6 and said retractor device including a pair of depending, diverging flanges secured to said lever and coactable with said frame to position said lever relative to said frame.

8. A turf perforating machine as defined in claim 7 and said frame including an elongated angle iron secured transversely to said frame with said iron having a pair of upstanding legs against which said flanges seat when said lever is in an operating and a nonoperating position.

* * * * *

UNITED STATES PATENT AND TRADEMARK OFFICE
CERTIFICATE OF CORRECTION

PATENT NO. : 4,084,642

DATED : April 18, 1978

INVENTOR(S) : Marvin L. Killion

It is certified that error appears in the above-identified patent and that said Letters Patent are hereby corrected as shown below:

Column 1, line 9, "solid" should read --soil--;

Column 1, line 62 "ae" should read --are--;

Signed and Sealed this

Twenty-first Day of November 1978

[SEAL]

Attest:

RUTH C. MASON
Attesting Officer

DONALD W. BANNER
Commissioner of Patents and Trademarks